(12) United States Patent
Ogura et al.

(10) Patent No.: US 7,544,337 B2
(45) Date of Patent: Jun. 9, 2009

(54) IMPURITY DISPOSAL SYSTEM AND METHOD

(75) Inventors: Kazumasa Ogura, Hiroshima (JP); Masaki Iijima, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 384 days.

(21) Appl. No.: 10/563,010

(22) PCT Filed: Apr. 8, 2005

(86) PCT No.: PCT/JP2005/006927

§ 371 (c)(1),
(2), (4) Date: Dec. 29, 2005

(87) PCT Pub. No.: WO2005/099890

PCT Pub. Date: Oct. 27, 2005

(65) Prior Publication Data

US 2006/0177364 A1    Aug. 10, 2006

(30) Foreign Application Priority Data

Apr. 12, 2004  (JP) .............................. 2004-117187

(51) Int. Cl.
*B01D 53/52* (2006.01)
*B01D 53/62* (2006.01)
*C10G 31/00* (2006.01)
*C10L 3/10* (2006.01)

(52) U.S. Cl. .................. 423/210; 423/220; 208/177; 208/208 R; 48/127.3; 48/127.5; 48/127.7; 48/128

(58) Field of Classification Search ............... 423/210, 423/220; 422/168, 187; 208/177, 208 R; 48/127.3, 127.5, 127.7, 128
See application file for complete search history.

(56) References Cited

U.S. PATENT DOCUMENTS 1,968,864 A * 8/1934 Wineman ............... 417/295
4,483,834 A * 11/1984 Wood .................... 423/228
5,853,680 A   12/1998 Iijima et al.
5,868,005 A   2/1999 Larue et al.

FOREIGN PATENT DOCUMENTS

| JP | 6-170215 | 6/1994 |
| JP | 9-100478 | 4/1997 |
| JP | 10-102076 | 4/1998 |
| JP | 2000-54855 | 2/2000 |

* cited by examiner

*Primary Examiner*—Timothy C Vanoy
(74) *Attorney, Agent, or Firm*—Westerman, Hattori, Daniels & Adrian, LLP.

(57) ABSTRACT

An impurity removing unit removes an impurity gas from a target gas while the target gas is in a gaseous state. A compressing unit compresses the impurity gas to produce compressed impurity gas. A drying unit removes water from the compressed impurity gas to produce a dried compressed impurity gas. A disposing unit disposes the dried compressed impurity gas into an underground aquifer.

9 Claims, 7 Drawing Sheets

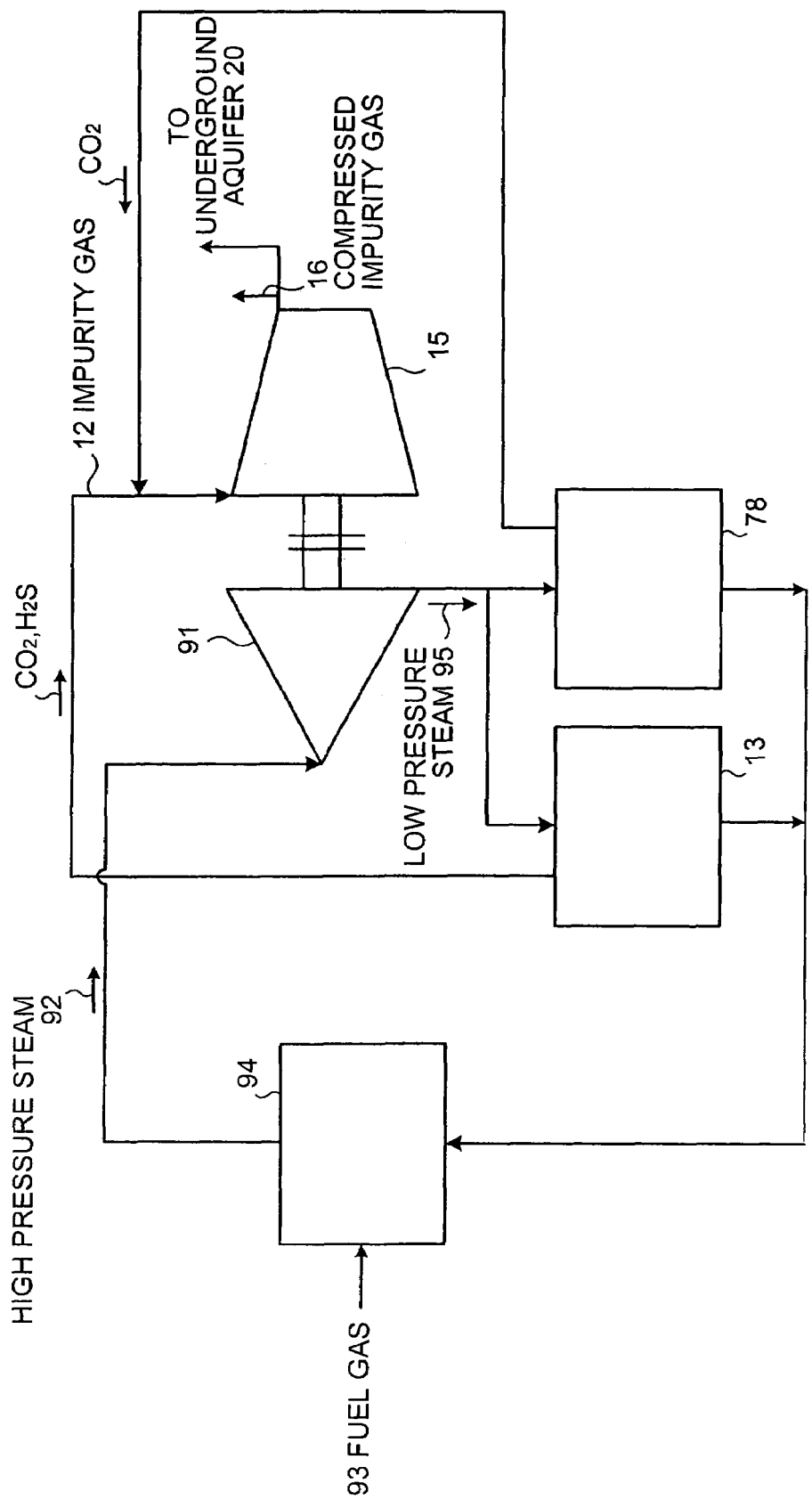

IMPURITY DISPOSAL SYSTEM AND METHOD

TECHNICAL FIELD

The present invention relates to an impurity disposal system and an impurity disposal method for disposing underground, impurities contained in, for example, natural gas (NG).

BACKGROUND ART

Liquefied natural gas (LNG) is drawing attention as a clean energy source. LNG is produced by removing impurities such as carbon dioxide ($CO_2$) and a sulfur component (for example, $H_2S$) contained in natural gas, removing water therein, and liquefying the resultant natural gas by a liquefaction apparatus in an LNG plant.

In this process, a large amount of fuel exhaust gas including carbon dioxide is generated from a power source (for example, a boiler) that drives a carbon dioxide removing apparatus for removing the carbon dioxide in the natural gas, a liquefaction apparatus, or the like in a production process. The burnt fuel exhaust gas is discharged into the air without performing any processing. This fuel exhaust gas raises an environmental issue such as global warming.

Therefore, conventionally, there is proposed a method for press-fitting the $CO_2$ together with water into an underground aquifer instead of discharging the $CO_2$ into the air (Patent Document 1).

Patent Document 1: Japanese Patent Application-Laid-Open No. H6-170215

DISCLOSURE OF INVENTION

Problem to be Solved by the Invention

According to the technology disclosed in the Patent Document 1, the $CO_2$ is mixed with water, a density of a liquid in a pipe is increased, and a static pressure is increased, thereby reducing a pressure used in press-fitting so as to press-fit the $CO_2$ into the ground at a lower pressure. However, because of the presence of water, pipes and the like corrode easily. If the -liquid contains a large amount of sulfur, in particular, the process of deterioration accelerates.

It is, therefore, necessary to apply anticorrosion lining and high-grade stainless steel to the pipes and the like, which disadvantageously pushes up the cost.

The present invention has been achieved in view of the above problems. It is an object of the present invention to provide an impurity disposal system and an impurity disposal method free from pipe corrosion.

Means for Solving Problem

A first invention according to the present invention to solve the above problem includes an impurity disposal system for disposing underground, impurities in a natural gas or an oil accompanying gas, that includes an impurity removing apparatus that removes the impurities in a gaseous state; a compressor that compresses the removed impurity gas; and a drying apparatus that removes a water in the compressed impurity gas, wherein a dried and compressed impurity gas is disposed into an underground aquifer.

In a second invention according to the first invention, the impurity disposal system includes the impurity gas that is carbon-dioxide or hydrogen sulfide.

In a third invention according to the first invention, the impurity disposal system includes a drive that drives the compressor that is a gas turbine, a gas engine, or a steam turbine.

In a fourth invention according to the third invention, the impurity disposal system includes a carbon dioxide-removing apparatus that removes carbon dioxide discharged from the drive and an equipment accompanying the drive, wherein the carbon dioxide removed by the removing apparatus is mixed with the impurity gas and a resultant mixture gas is disposed into the underground aquifer.

In a fifth invention according to the third invention, the impurity disposal system includes that steam from a boiler that recovers a waste heat discharged from the gas turbine or the gas engine is used for a heat source during removal of impurities.

A sixth invention includes an impurity disposal method for disposing underground, impurities in a natural gas or an oil accompanying gas, that includes steps of: removing the impurities in a gaseous state; compressing the removed impurity gas; removing a water in the compressed impurity gas; and disposing the dried and compressed impurity gas into an underground aquifer.

In a seventh invention according to the sixth invention, the impurity disposal method includes the impurity gas that is carbon dioxide or hydrogen sulfide.

In an eight invention according to the sixth invention, the impurity disposal method includes that a drive that drives the compressor that compresses the impurity gas is a gas turbine, a gas engine, or a steam turbine.

In a ninth invention according to the eighth invention, the impurity disposal method includes removing carbon dioxide discharged from the drive and an equipment accompanying the drive, wherein the carbon dioxide is mixed with the impurity gas and a resultant mixture gas is disposed into the underground aquifer.

In a tenth invention according to the eighth invention, the impurity disposal method includes that steam from a boiler that recovers a waste heat discharged from the gas turbine or the gas engine is used for a heat source during removal of impurities.

Effect of the Invention

According to the present invention, after the compressor compresses impurities, the drying apparatus removes the water in the gas to provide dry gas. It is, therefore, possible to prevent corrosion of the pipe for introducing the gas into the ground and to improve durability over a long period of time. In addition, since the impurities such as carbon dioxide are not diffused into the air, global warming-can be prevented.

BRIEF DESCRIPTION OF DRAWINGS

FIG. 7 is a schematic diagram of an apparatus that employs a steam turbine as a drive according to a fifth embodiment.

EXPLANATIONS OF LETTERS OR NUMERALS

Figure 1:
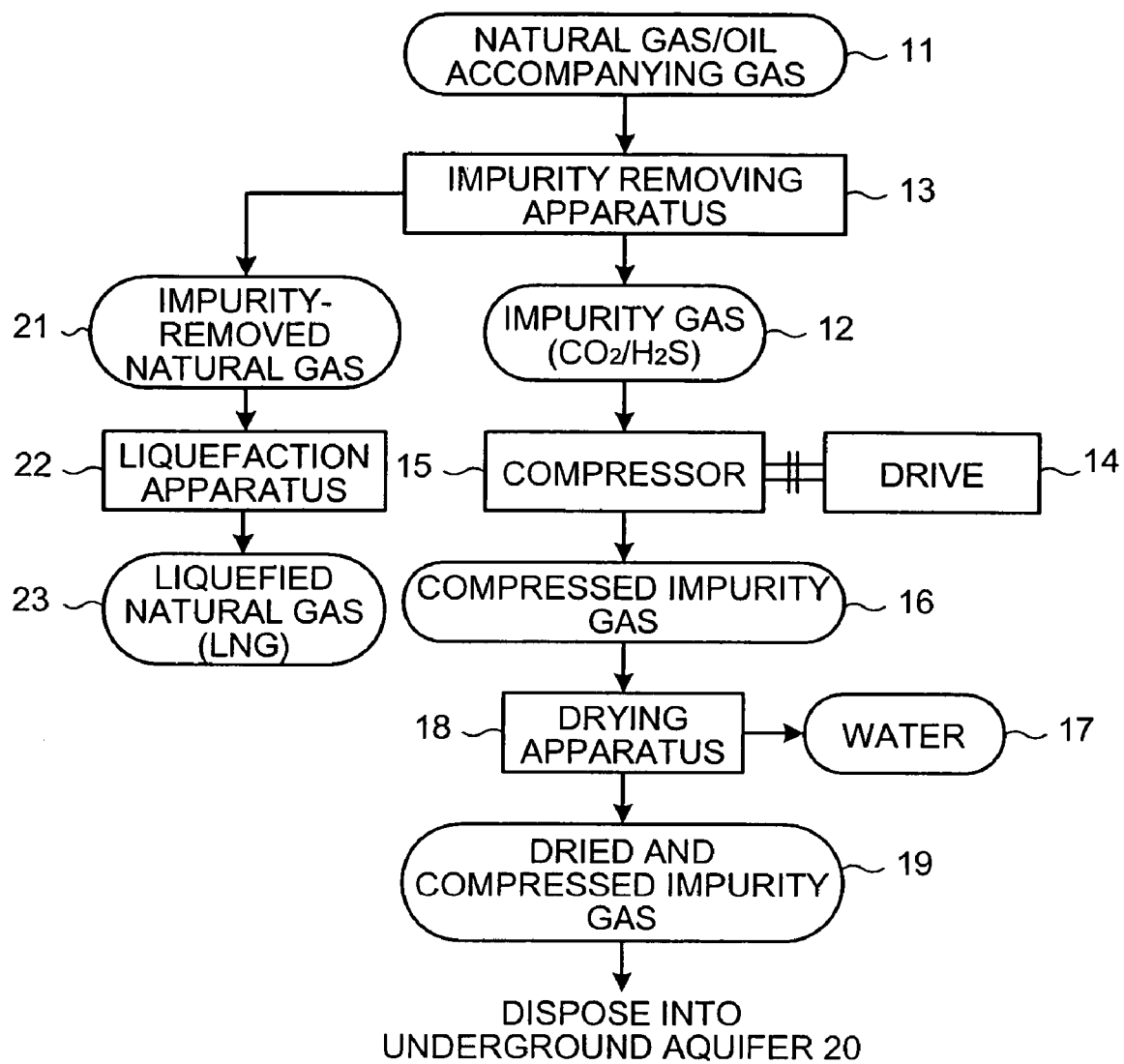
FIG. 1 is a schematic of an impurity disposal system according to a first embodiment of the present invention.

11 Natural gas (or oil accompanying gas)
12 Impurity gas
13 Impurity removing apparatus
14 Drive
15 Compressor
16 Compressed impurity gas
17 Water
18 Drying apparatus
19 Dried and compressed impurity gas
20 Underground aquifer
21 Impurity-removed natural gas
22 Liquefaction apparatus
23 Liquefied natural gas (LNG)

BEST MODE(S) FOR CARRYING OUT THE INVENTION

The present invention will be explained in detail with reference to the accompanying drawings. Note that the present invention is not limited to the following embodiments. Constituent elements of the embodiments include ones that will readily occur to those skilled in the art, or ones that are substantially equivalent.

First Embodiment

An impurity disposal system according to a first embodiment of the present invention will be explained with reference to the accompanying drawings.

FIG. 1 is a schematic of the impurity disposal system according to the first embodiment.

As shown in FIG. 1, the impurity disposal system according to the first embodiment is used for disposing underground, impurities contained in natural gas (or oil accompanying gas) 11. The impurity disposal system includes an impurity removing apparatus 13 that removes impurities from the gas, a compressor 15 that compresses removed impurity gas 12 and that is driven by a drive 14, and a drying apparatus 18 that removes water 17 from the compressed impurity gas 16. The impurity disposal system disposes dried and compressed impurity gas 19 into an underground aquifer 20.

Impurity-removed natural gas 21 is supplied to a liquefaction apparatus 22 that liquefies the natural gas and that is in an LNG plant, to become liquefied natural gas (LNG) 23. This liquefied natural gas 23 is exported worldwide by, for example, LNG ships. Alternatively, the natural gas 21 in a gaseous state is sometimes supplied to, for example, a GTL plant through a pipeline without being liquefying.

In the apparatuses according to this embodiment, after the impurity gas 12 is compressed by the compressor 15, the drying apparatus 18 removes water in the gas to obtain dried and compressed impurity gas 19. It is, therefore, possible to prevent corrosion of a pipe for introducing the dried and compressed impurity gas 19 into the ground, and to improve durability of plant facilities over a long period of time. Furthermore, since carbon dioxide ($CO_2$), which is the impurity gas, is not diffused into the air, it is possible to prevent global warming. Since hydrogen sulfide ($H_2S$), which is the impurity gas, is not diffused simultaneously with the carbon dioxide, it is unnecessary to separately provide a processing apparatus for fixing the S component and, therefore, possible to simplify the plant facilities.

Figure 2:
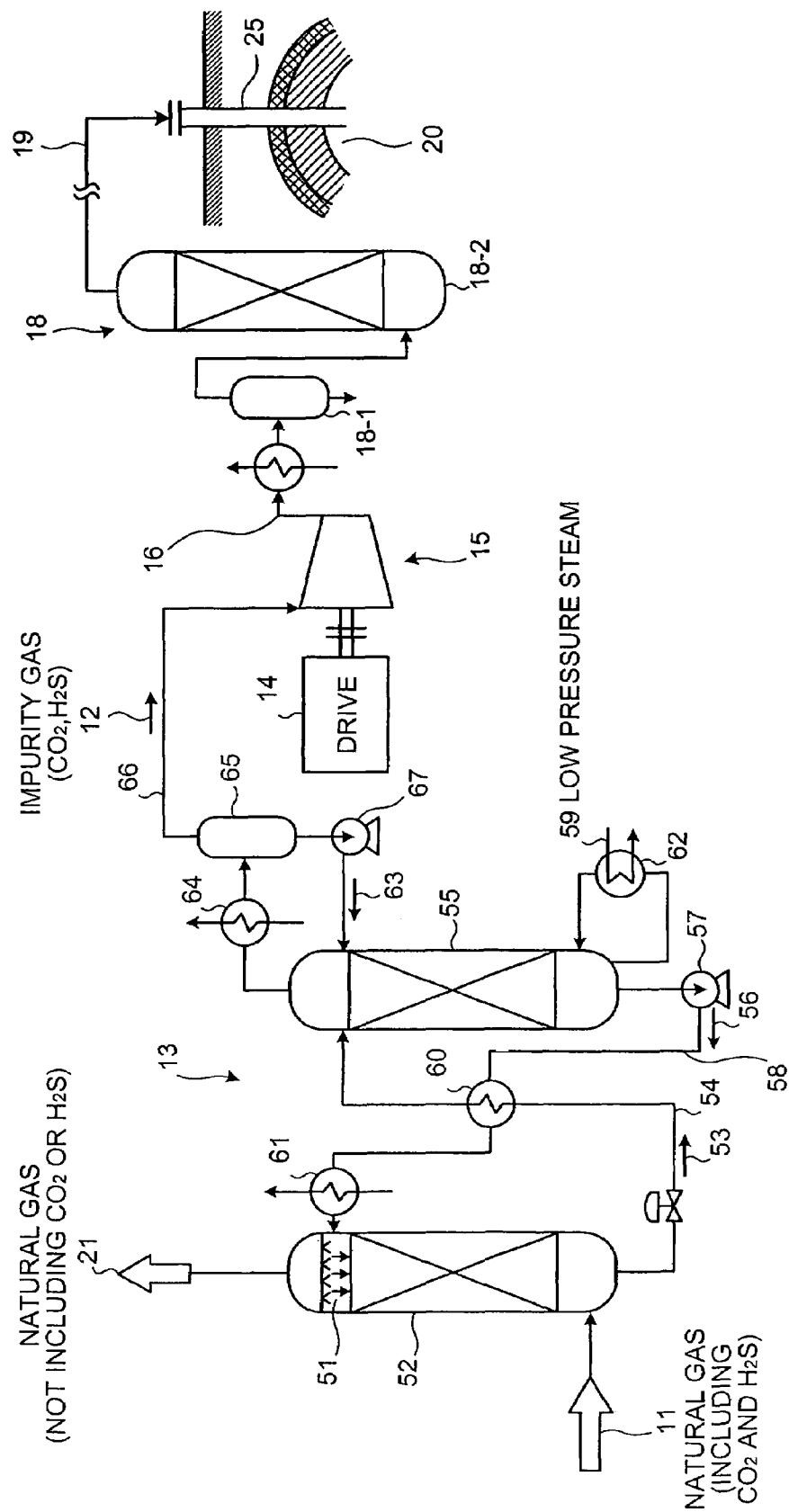
FIG. 2 is a specific example of the impurity disposal system according to the first embodiment.

With reference to FIG. 2, one example of an impurity processing system will be explained specifically.

In this embodiment, carbon dioxide ($CO_2$) is exemplified as the impurity gas. However, the impurity removing apparatus can similarly remove the hydrogen sulfide ($H_2S$) as the impurities.

As shown in FIG. 2, the impurity disposal system includes the impurity removing apparatus 13 that removes the impurity gas 12 in the natural gas 11, the compressor 15 that compresses the removed impurity gas 12, the drying apparatus 18 that dries the compressed impurity gas 16, and a pipe 25 for supplying the dried and compressed impurity gas 19 into the underground aquifer 20.

As shown in FIG. 2 in detail, the impurity removing apparatus 13 includes an absorption column 52 that brings the $CO_2$-containing natural gas 11, which contains $CO_2$ as the impurity gas, into contact with a $CO_2$ absorbing liquid 51, which absorbs the $CO_2$, in order to absorb the $CO_2$, a feed line 54 that supplies a rich solution 53 that absorbs the $CO_2$ discharged from a lower portion of the absorption column 52, a regeneration column 55 that regenerates the supplied-rich solution 53, and a feed line 58 that supplies a lean solution (regenerated liquid) 56 from which the $CO_2$ is removed by the regeneration column 55 to the absorption column 52 by a feed pump 57. Reference numeral 60 denotes a heat exchanger and 61 denotes a cooler provided at need.

In a lower portion of the regeneration column 55, the absorbing liquid is regenerated by heat applied from a regenerator-heater 62 to which low pressure steam 59 is supplied, cooled by the heat exchanger 60 and the cooler 61, which is provided at need, through the feted line 58, and returned to the $CO_2$ absorption column 52.

In an upper portion of the regeneration column 55, the $CO_2$ separated from the absorbing liquid is brought into contact with reflux water 63 supplied from a nozzle (not shown), and cooled by a regeneration column reflux cooler 64. Steam accompanying the $CO_2$ is separated from the condensed reflux water by a $CO_2$ separator 65, and supplied to the compressor 15 as the impurity gas 12 through a recovered $CO_2$ discharge line 66. A part of the reflux water 63 is returned to the regeneration column 55 by a reflux water pump 67. An amount of the impurity gas 12 supplied through the discharge line 66 is, for example, $20 \times 10^6$ SCFD (Standard cubic feet per day) at 0.05 megapascal.

The impurity gas ($CO_2$) 12 supplied from the recovered $CO_2$ discharge line 66 is supplied to the compressor 15 driven by the drive 14, compressed by the compressor 15, and then supplied to the drying apparatus 18.

The drying apparatus 18 is configured by a gas-liquid separator 18-1 and a dehydration column 18-2. The gas-liquid separator 18-1 removes most of the water in the gas, and the dehydration column 18-2 sets the water amount in the gas to be a predetermined concentration (50 parts per million or less).

The dehydration column 18-2 uses triethylene glycol and the like as a dehydrating agent.

The dried and compressed impurity gas 19 dried by the drying apparatus 18 is disposed into the underground aquifer 20 through a pipe. At this time, compression pressure is, for example, 14 megapascals.

An absorbent for impurity gases such as $CO_2$ that can be used in the present invention is not particularly limited. However, alkanolamines and hindered amines having an alcoholic hydroxyl group may be mentioned. Examples of such alkanolamines include monoethanolamine, diethanolamine, triethanolamine methyldiethanolamine, diisopropanolamine, and diglycolamine. Usually, monoethanolamine (MEA) is preferably used. Examples of the hindered amines having an alcoholic hydroxyl group include 2-amino-2-methyl-1-propanol (AMP), 2-(ethylamino)-ethanol (EAE), 2-(methylamino)-ethanol (MAE), and 2-(diethylamino)-ethanol (DEAE).

Second Embodiment

Figure 3:
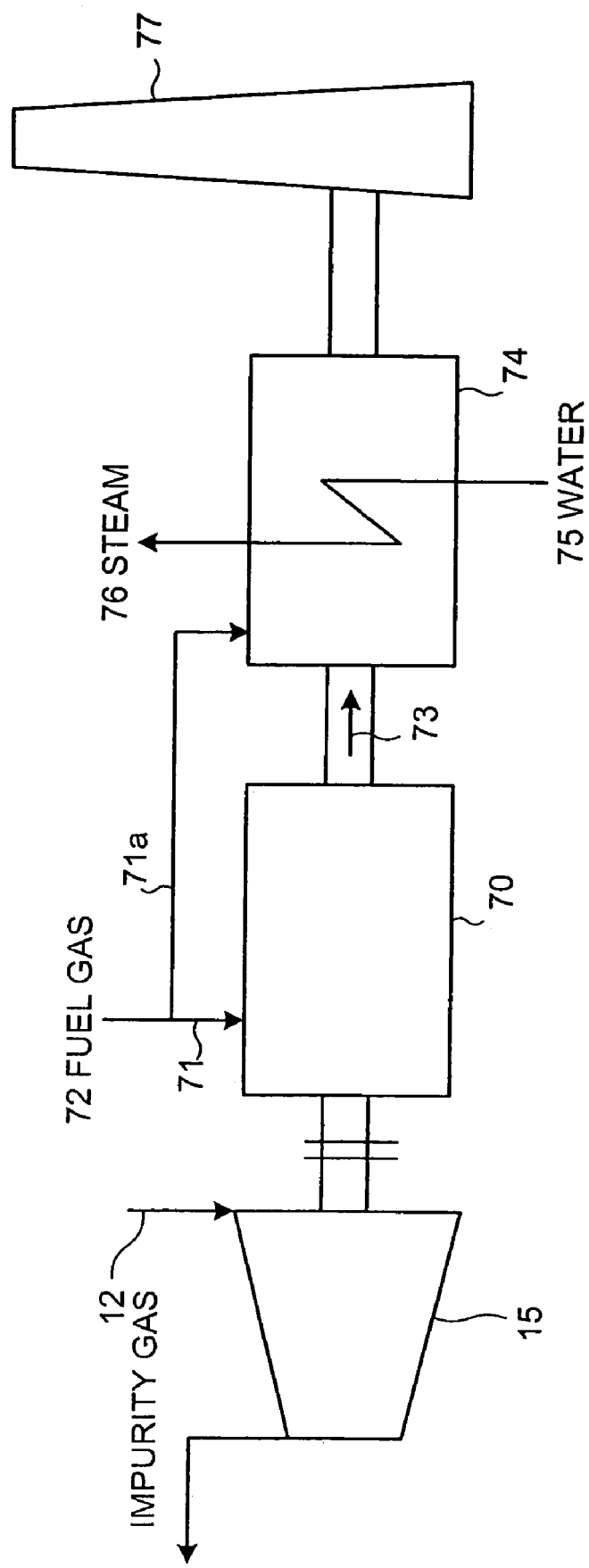
FIG. 3 is a schematic of an apparatus that employs a gas turbine as a drive according to a second embodiment of the present invention.

An impurity disposal system shown in FIG. 3 employs a gas turbine 70 as one example of a drive that drives the compressor 15. Since the impurity disposal system can similarly employ a gas engine as the drive, an instance of employing the gas engine will not be explained herein.

As shown in FIG. 3, the gas turbine 70 that drives the compressor 15 is driven by fuel gas 72 supplied from a fuel gas line 71, and rotates the compressor 15, thereby compressing the impurity gas 12. A gas composition of the fuel gas 72 is 90% of methane, and 10% of ethane, with a lower heating value (LHV) of 9220 kcal/Nm$^3$ and a gas amount of 1640 Nm$^3$/hr. If there is insufficient steam, then additional steam can be produced by heating a waste heat recovery boiler 74 with the fuel gas 72 supplied through a fuel line 71a.

Exhaust gas 73 from the gas turbine 70 is heat-exchanged with supplied water 75 by the waste heat recovery boiler 74 that recovers heat of the exhaust gas 73, thereby producing steam 76. The exhaust gas is then discharged from a chimney 77. The amount of the steam 76 obtained herein is 14.8 t/hr at 0.3 megapascal. The amount of the exchanged heat is, for example, $7.56 \times 10^6$ kcal/hr.

This steam 76 is used for the low pressure steam 59 shown in FIG. 2.

Figure 4:
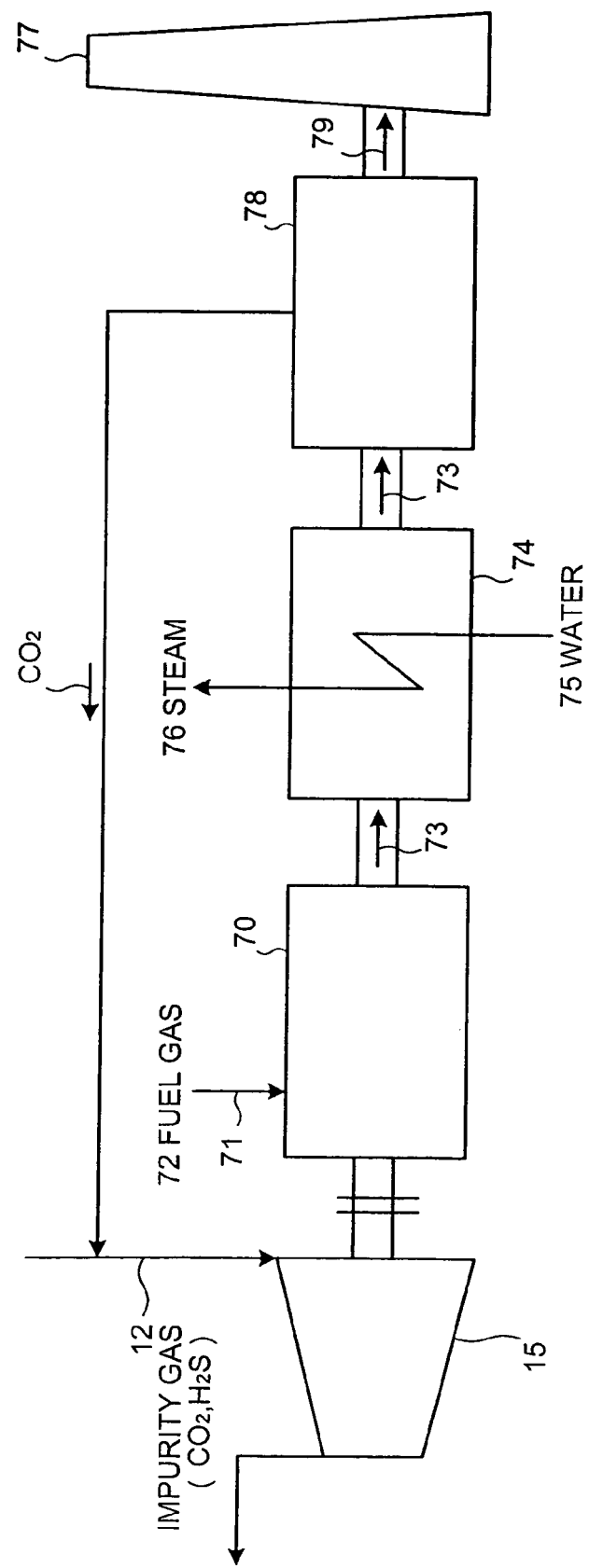
FIG. 4 is a schematic of an apparatus that includes a carbon dioxide recovery apparatus according to the second embodiment.

An impurity disposal system shown in FIG. 4 is designed to recover and remove $CO_2$ contained in the exhaust gas 73 subjected to the heat exchange by the waste heat recovery boiler 74 in the impurity disposal system shown in FIG. 3. Like reference numerals denote like constituent elements as those shown in FIG. 3, and therefore, explanation thereof will be omitted.

As shown in FIG. 4, a carbon dioxide recovery apparatus 78 is provided in rear side of the waste heat recovery boiler 74. The $CO_2$ removed by the carbon dioxide recovery apparatus 78 that recovers and removes the carbon dioxide is mixed with the impurity gas 12. A resultant mixture gas is compressed by the compressor 15 and dried before being disposed into the underground aquifer 20. With this arrangement, the $CO_2$ in the exhaust gas from the waste heat recovery boiler 74 that is equipment accompanying the gas turbine is not diffused into the air, thus contributing to prevention of global warming.

Third Embodiment

Figure 5:
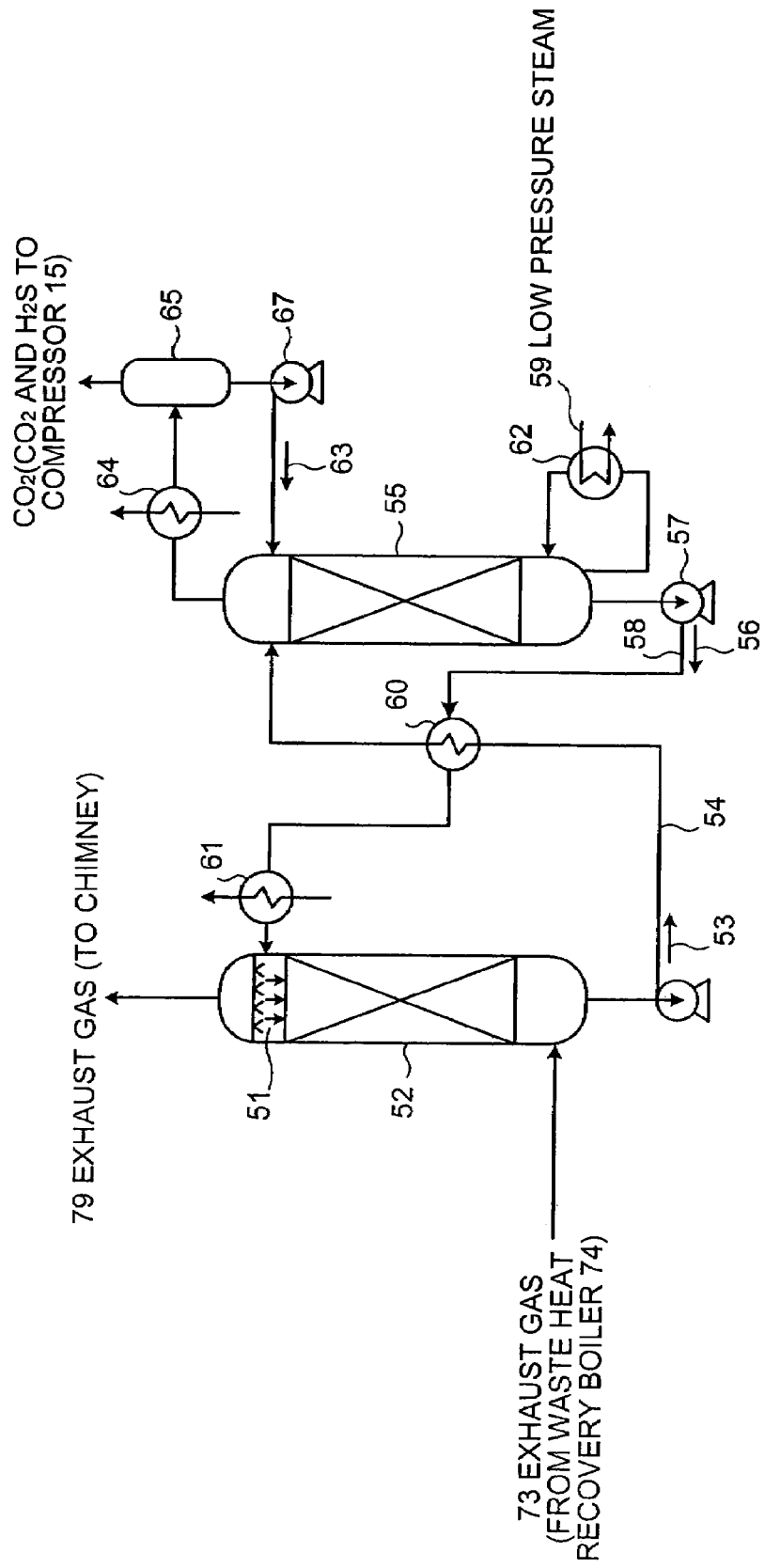
FIG. 5 is a schematic of a carbon dioxide recovery apparatus according to a third embodiment.

FIG. 5 is a schematic diagram of one example of the carbon dioxide recovery apparatus 78 shown in FIG. 4. An impurity disposal system shown in FIG. 5 is substantially equal in apparatus configuration to the impurity removing apparatus explained above. Like reference-numerals denote like constituent elements, and therefore, explanation thereof will be omitted.

As shown in FIG. 5, the exhaust gas 73 from the waste heat recovery boiler 74 is introduced into the absorption column 52, and brought into contact with the absorbing liquid 51 in the absorption column 52, whereby the $CO_2$ is recovered. $CO_2$-removed exhaust gas 79 is supplied to the chimney 77 and diffused into the air. Furthermore, the separated and recovered $CO_2$ is mixed with the impurity gas 12 and resultant mixture gas is compressed by the compressor 15.

The steam 76 from the waste heat recovery boiler 74 shown in FIG. 4 is also used for the low pressure steam 59 used for a regeneration treatment performed by the regeneration column 55 of the carbon dioxide recovery apparatus 78.

Fourth Embodiment

Figure 6:
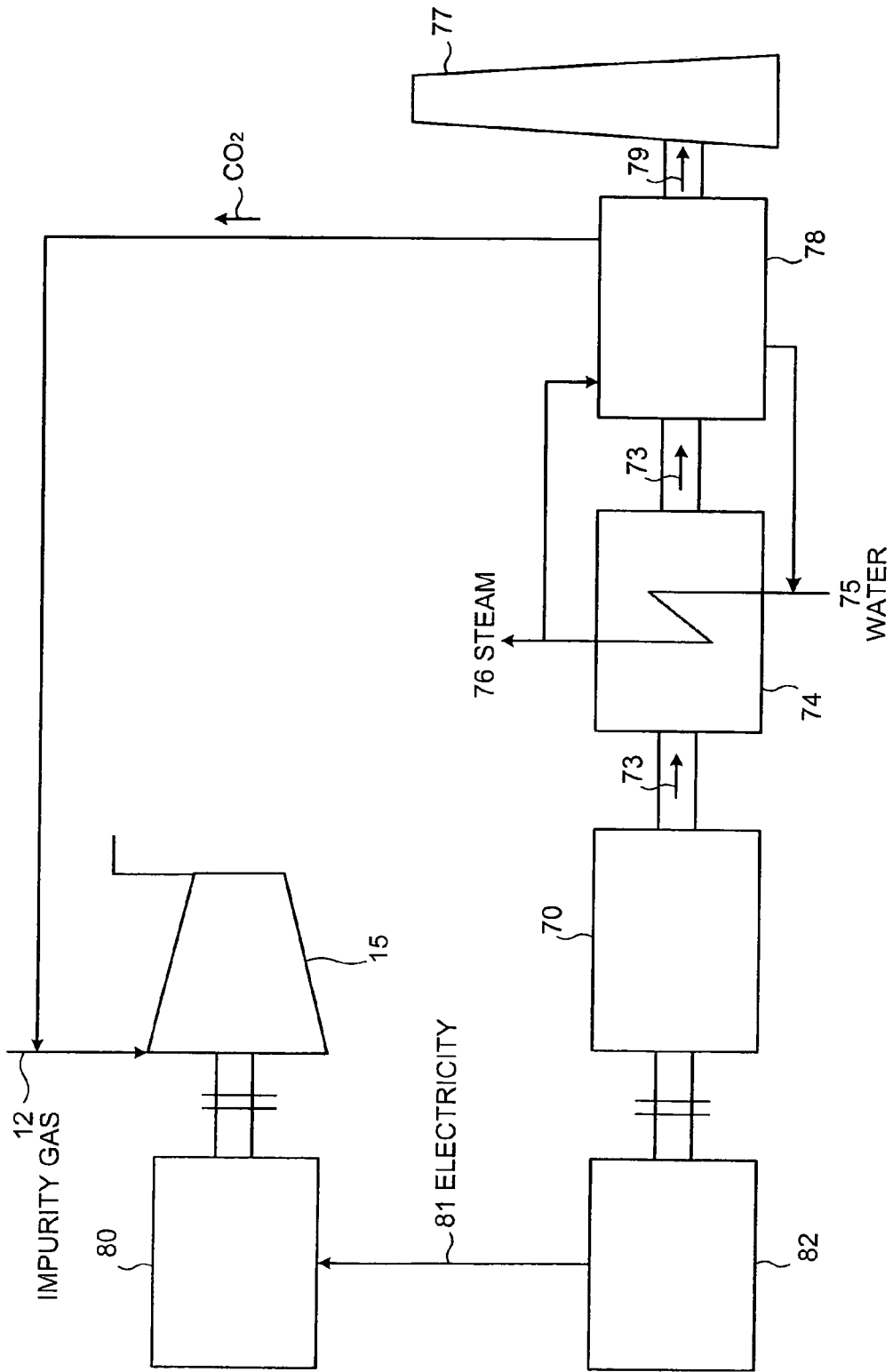
FIG. 6 is a schematic of an apparatus that employs a motor as a drive according to a fourth embodiment.

FIG. 6 depicts an apparatus that employs a motor 80 as a driving source that drives the compressor 15. Electricity 81 for driving the motor 80 is generated by a generator 82 driven by the gas turbine 70. The recovery of the $CO_2$ contained in the exhaust gas 73 which has been subjected to the heat exchange by the waste heat recovery boiler 74 is performed similarly to that shown in FIG. 4. In FIG. 6, like reference numerals denote like constituent elements as those shown in FIG. 4, and therefore, explanation thereof will be omitted. With the above configuration, the $CO_2$ in the exhaust gas from the waste heat recovery boiler 74 which is the equipment accompanying the gas turbine 70 when the electricity. 81 for driving the motor 80 is obtained from the generator 82, is not diffused into the air, thus contributing to prevention of the global warming.

Fifth Embodiment

FIG. 7 depicts an apparatus that employs a steam turbine 91 as the driving source that drives the compressor 15. A high pressure steam 92 (4 megapascals) is obtained by heat exchange performed in a boiler 94 by supplying fuel gas 93. A low pressure steam 95 (0.3 megapascal) discharged from the steam turbine 91 is used for the low pressure steam 59 to be used for the impurity removing apparatus 13 and the carbon dioxide recovery apparatus 78. As a result, the low pressure steam 95 from the steam turbine 91 can be effectively used. The gas in the natural gas and the $CO_2$ in the exhaust gas are not diffused into the air, thus contributing to prevention of the global warming.

In the embodiments, after the impurities such as carbon dioxide discharged from the boiler or the like, which is an equipment accompanying the gas turbine, the steam turbine, or the like are removed, the resultant gas together with the impurity gas 12 is disposed into the underground aquifer. It is, therefore, possible to prevent the global warming. The equipment accompanying the gas turbine, the steam turbine, or the like is not limited to the boiler or the like. Arbitrary equipment can be used as long as it discharges impurities such as carbon dioxide.

INDUSTRIAL APPLICABILITY

As explained above, according to the present invention, the impurity gas is disposed into the underground aquifer after being dried. Therefore, the present invention is suited for a liquefied natural gas plant free from pipe corrosion and having improved durability of the equipment.

The invention claimed is:
1. A method of removing and disposing impurities contained in a target gas, comprising:
   removing an impurity gas from the target gas while the target gas is in a gaseous state;
   compressing the impurity gas to produce compressed impurity gas;
   removing water from the compressed impurity gas to produce a dried compressed impurity gas; and disposing the dried compressed impurity gas into an underground aquifer, wherein the compressing is performed by a driving unit, and the target gas includes a mixture of gas and oil.

2. The method according to claim 1, wherein the target gas includes natural gas.

3. The method according to claim 1, wherein the impurity gas includes carbon dioxide.

4. The method according to claim 1, wherein the impurity gas includes hydrogen sulfide.

5. The method according to claim 1, wherein the compressing is performed using a gas turbine.

6. The method according to claim 1, wherein the compressing is performed using a gas engine.

7. The method according to claim 1, wherein the compressing is performed using a steam turbine.

8. The method according to claim 1, further comprising:

removing carbon dioxide produced by a device that drives a compressor that performs the compressing; and mixing the carbon dioxide with the impurity gas, wherein the compressing includes compressing a mixture of the carbon dioxide and the impurity gas.

9. The method according to claim 1, further comprising:

collecting steam produced by a boiler that recovers a waste heat discharged from the gas turbine; and using the steam as a heat source during removal of impurities.

* * * * *